Paul Nourry and
Daniel Gluksmann-Rodanski
Inventors by Louis Barnett
Attorney

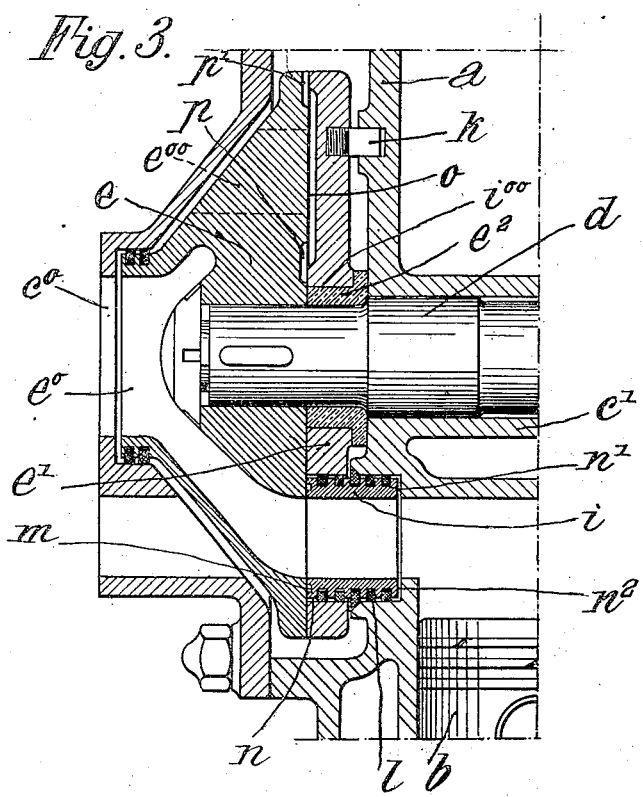
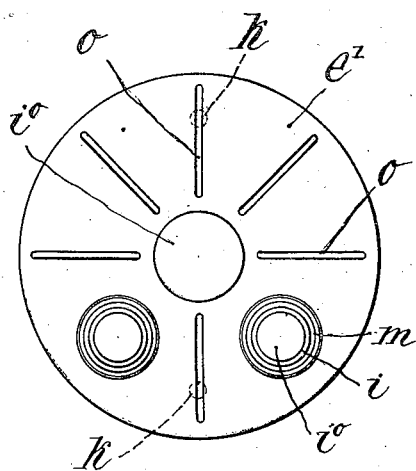
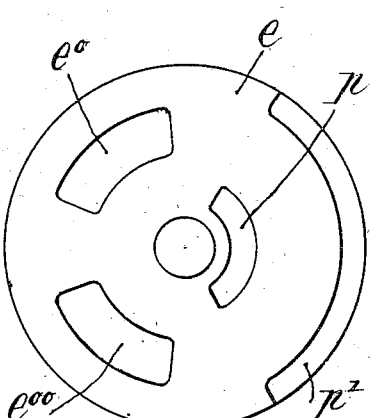

Patented Aug. 11, 1931

1,818,921

UNITED STATES PATENT OFFICE

PAUL NOURRY AND DANIEL GLUKSMANN-RODANSKI, OF LYON, FRANCE

ROTARY VALVE FOR RECIPROCATING ENGINES

Application filed November 30, 1928, Serial No. 322,882, and in Belgium December 5, 1927.

The present invention relates to rotary valves for reciprocating engines and, more especially, for internal combustion engines.

One of the objects of the invention is to provide an assembly of rotary valve and cylinder in which both the intake and exhaust operations may occur through a single orifice formed in the latter.

Another object is to better balance the pressures exerted by the circulating fluids on opposite sides of the rotary valve.

Further objects will appear in the course of the detailed description now to be given with reference to the accompanying drawings, in which:—

Fig. 3 is a section similar to Fig. 2 of a second form of the invention;

Figs. 4 and 5 show the frictional surfaces of the valve and of the valve seat represented in Fig. 3.

Figure 1:
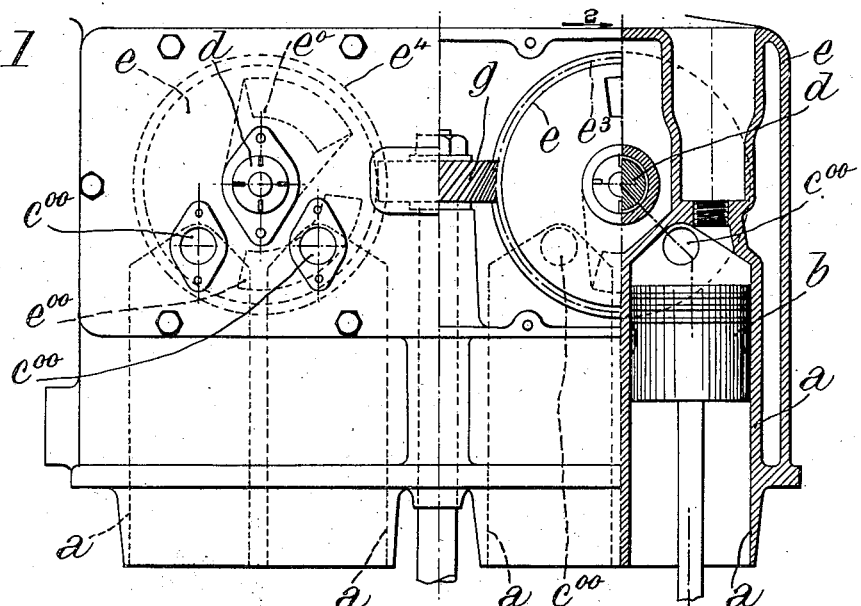
Fig. 1 is an elevation, partially in section (on line 1—1 of Fig. 2), of one illustrative embodiment of the invention.
Figure 2:
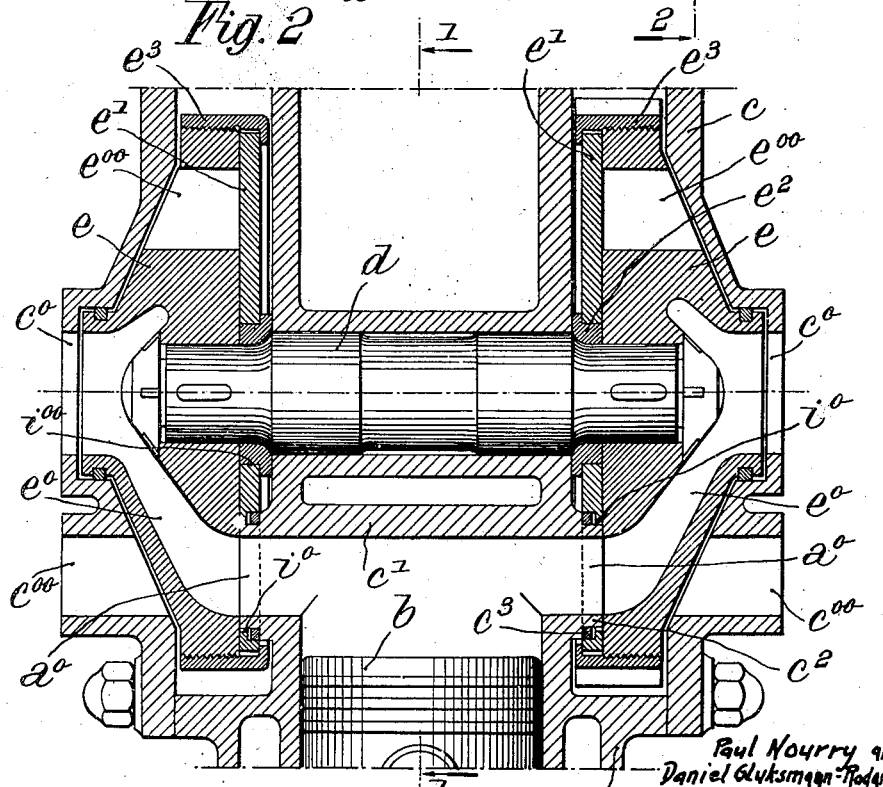
Fig. 2 is a section taken on line 2—2 of Fig. 1.

Referring to Figs. 1 and 2 of the drawings, there is shown, a cylinder block containing an even number of cylinders $a$,—a plurality of pistons $b$,—bearing blocks $c$,— shafts $d$ mounted on blocks $c^1$,—pair of ports $a^0$ communicating with one side of each piston $b$,—valve casings $c$, cleaning passages $c^0$, $c^0$ and pairs of passages $c^{00}$, $c^{00}$ formed therein communicating with the intake and discharge manifolds respectively,—rotatable valves $e$ keyed to shafts $d$ having intake passages $e^0$ and discharge passages $e^{00}$ formed therein adapted to establish communication successively between $a^0$ and $c^0$ and between $a^0$ and $c^{00}$,—valve seats $e^1$ having openings $i^0$ formed therethrough and fitting over shoulders $c^2$ of blocks $c^1$ and opening $i^{00}$ fitting over collars $e^2$ keyed to shafts $d$,—rings $c^3$ sealing joints $c^2$, $i^0$,—crowns $e^3$ threadedly engaging with valves $e$ and slidably engaging with the periphery of seats $e^1$,— and an endless screw $g$ meshing with helicoidal teeth $e^4$ formed on the periphery of valves $e$.

The manner in which the foregoing assembly operates is practically evident from the description. Elements $g$ rotate valves $e$, and bring passages $c^0$, $e^0$, $a^0$ and $c^{00}$, $e^{00}$, $a^0$ successively into line thus effecting the feed of motor fluid to, and the discharge of burnt or expanded fluid from, cylinders $a$.

In the form of construction illustrated in Figs. 3 to 5, the general assembly remains the same, but different means are employed for preventing leakage at joints. Here valve seat $e^1$ and port $a^0$ traverse an annular element $i$ provided with piston rings $l$, spaces being provided at $n$, $n^1$ and $n^2$ between $i$ and the walls with which it coacts. One of the piston rings $l$ is formed with a conical surface tending to take the thrust of element $i$ against valve $e$. Grooves $m$ are formed on the frictional surface of elements $i$ to insure against leakage and elements $e^1$ and $i$ are prevented from rotating by pins $k$ and convenient forms of stops (not shown), respectively.

A lubricating system, applicable as well to the structure represented in Figs. 1 and 2, is shown in connection with this form of device consisting of central grooves $p$ formed in valve $e$ communicating with an oil source (not shown) and discharging via grooves $o$ formed in seat $e^1$ and peripheral grooves $p$ and $p^1$ formed in $e$ to the valve casing and to an oil discharge conduit (not shown). It will be noted that the feed and discharge of oil occurs only when $p$ and $p^1$ are in line with grooves $o$ and that by properly positioning these three elements, circulation of oil between $p$ and $p^1$ may be interrupted during the passage of grooves $o$ past openings $e^{00}$ and $e^0$.

The various forms of assembly hereinabove described present the following advantages, (1) springs and equivalent structures for maintaining contact between the valve and its seat are eliminated; (2) a better balance is assured between the pressures exerted by the circulating fluids on the surfaces facing the valves (Figs. 1 to 5); and (3) gas tightness is assured by eliminating flexional effects on the valves and by reducing the effects due to expansion.

What we claim is:—

1. A machine of the class described comprising a cylinder having an opening in the wall thereof, a loosely mounted valve seat having an opening therethrough positioned in line with said first-named opening, a tube traversing both of aforesaid openings, means for sealing the joint between said tube and the walls of said openings, a rotatable valve having a plane surface in frictional contact with the valve seat, said valve having independent feed and discharge passages formed therethrough positioned to communicate successively with said tube during rotation of the valve, and discharge ports communicating with said passages during rotation of the valve.

2. A machine as defined in claim 1 in combination with means for lubricating the surface of contact between the valve and the valve seat, said means including a groove formed in the plane surface of the valve contacting with the valve seat and an elongated groove formed in the valve seat and positioned to overlap and communicating with said last named groove during rotation of the valve.

In testimony whereof we have signed this specification.

PAUL NOURRY.
DANIEL GLUKSMANN-RODANSKI.